United States Patent [19]

Hou et al.

[11] Patent Number: 5,623,141
[45] Date of Patent: Apr. 22, 1997

[54] X-RAY IMAGE INTENSIFIER WITH HIGH X-RAY CONVERSION EFFICIENCY AND RESOLUTION RATIOS

[75] Inventors: Xun Hou; Xiuqin Liu; Kezhou Ding, all of Xi'an, China

[73] Assignee: Xian Institute of Optics & Precision Mechanics, Academia Sinica, Xi'an, China

[21] Appl. No.: 322,502

[22] Filed: Oct. 14, 1994

[30] Foreign Application Priority Data

Oct. 16, 1993 [CN] China ................................. 93119245.5

[51] Int. Cl.⁶ .................................................. H01J 40/14
[52] U.S. Cl. ..................................... 250/214 VT; 313/526
[58] Field of Search ........................ 250/214 VT, 214 A, 250/370.09; 378/98.2–98.9; 313/526–530, 537, 542, 544

[56] References Cited

U.S. PATENT DOCUMENTS

| | | | |
|---|---|---|---|
| 4,142,101 | 2/1979 | Yin | 250/214 VT |
| 5,225,670 | 7/1993 | She et al. | 250/214 VT |
| 5,250,795 | 10/1993 | Koishi et al. | 250/214 VT |
| 5,285,061 | 2/1994 | She et al. | 250/214 VT |

*Primary Examiner*—Que T. Le
*Attorney, Agent, or Firm*—Armstrong, Westerman, Hattori, McLeland & Naughton

[57] ABSTRACT

A new type x-ray image intensifier has a specially developed x-ray sensitive photocathode which has a low/high density alkali halogenide structure and therefore has high conversion efficiency of converting x-ray directly into photoelectrons or a field-assisted x-ray photocathode which has an extracting field and therefore is able to provide a high conversion efficiency of x-ray to photoelectron and high spatial resolution, even high time resolution. The new type x-ray image intensifier consists of the x-ray photocathode, a MCP and a phosphor screen, forming a proximity focus type photoelectric imaging device.

A new portable x-ray diagnosis unit has the new type x-ray image intensifier and a new type compact x-ray source that has a very small volume, 30–90 kv acceleration voltage and a cone protective cover at the outlet of x-ray.

6 Claims, 3 Drawing Sheets

X-RAY IMAGE INTENSIFIER WITH HIGH X-RAY CONVERSION EFFICIENCY AND RESOLUTION RATIOS

FIELD OF INVENTION

The present invention relates to an improved x-ray image intensifier that has a new kind of x-ray photocathode and manufacturing method of the x-ray photocathode. The intensifier is capable of converting an x-ray image into an enhanced visible light image.

BACKGROUND OF THE INVENTION

There are 3 ways in x-ray image observing and recording in the prior art. The first way uses an x-ray film that is still being used nowadays because of its excellent long term reservation property and high resolution. However, there are some disadvantages in the first way. The most obvious disadvantage is that the developing and fixing of the film is too complicate and it is impossible to realize a real time observation. The second way involves a so-called converting screen that consists of (ZnCd)S with activator and is used to convert the x-ray into visible light for observation. The disadvantage of this way is that the efficiency of the converting screen is too low, so that it must be operated in a dark room, and the dose rate of the x-ray must be high enough in order to obtain certain brightness. The third way employs an x-ray image intensifier. The first generation of x-ray image intensifier was developed in the early 1950s which is actually a vacuum photoelectron imaging device built up on the principle of first converting the x-ray image into a visible light image by use of a converting screen, then converting the optical image into electronic image by means of a photocathode and finally focusing the electronic image onto the cathodeluminescence screen by use of an electron optical system to obtain a reduced bright visible image. The image enhancement of the image intensifier is realized by accelerating the photoelectron and reducing the size of the image. In the early stage, the converting screen of the image intensifier was made of zinc surphide and cadmium surphide. From the late 1960s to the early 1970s, a converting screen of CsI(Na) was developed with which both spatial resolution and x-ray converting efficiency are improved significantly. Up to now, this kind of x-ray intensifier is still being used as a key pan of an x-ray TV fluoroscopy system. However, as the electron-optic system of the x-ray image intensifier is complicated and its assembling is very critical and the manufacturing processes of the CsI(Na) converting screen and the whole tube are extremely sophisticated, the imaging quality depends on the stability of power supply too, the whole system itself is a 9 to 12 inches large vacuum device that is very expensive and unportable, this kind of x-ray intensifier is limited to be used in large hospital only.

In 1971–1972, an x-ray intensifier with an x-ray converting screen and a double-proximity focus visible light image intensifier was published in "IEEE Transaction on Electron Devices," Vol. 18, pp. 1101–1108(1971) and "Advances in electronics and electron physics," Vol. 33A, PP. 153–165(1972) by I. C. P. Miller. By means of proximity focus, image distortion of the image intensifier and influence of voltage fluctuation and magnetic field interference on imaging quality are eliminated and the requirement for mechanical assembling accuracy is significantly lowered. Some improvements in manufacturing process of said image intensifier made by Lol Yin was shown in U.S. Pat. No. 4,142,101 in which the converting screen was deposited on the outer side of the input fiber-optical plate of the visible light image intensifier. The common feature of Miller and Lol Yin's x-ray image intensifiers is the use of the combination of an x-ray converting screen with a double-proximity focus visible light image intensifier. A fatal weakness of this x-ray intensifier is that the usable area is limited by the visible light image intensifier and it is difficult to manufacture a visible light image intensifier with large aperture. The apertures of double-proximity focus visible light image intensifier has been still limited 40 mm of diameter nowadays and therefore this patented technology can not be used widely.

A plate x-ray image intensifier was disclosed in U.S. Pat. No. 4,104,516 that is comprised of a converting screen/photocathode and a fluorescent screen with a spacer of 8–20 mm between them and a voltage of 15–60 kv. The advantage of said plate x-ray image intensifier is that its aperture can be made large enough without causing any image distortion. However, since the gain of light is obtained only by accelerating the photoelectron by use of high voltage, gain and resolution of this type intensifier are relatively low. On the basis of U.S. Pat. No. 4,104,516, a type of two stage x-ray image intensifiers in series was built as disclosed in U.S. Pat. No. 4,362,933. The said x-ray image intensifier is formed by inserting an intermediate screen/photocathode component between the input and output screens of the said plate x-ray image intensifier described in U.S. Pat. No. 4,104,516. Because one side of the said intermediate screen is a fluorescent screen and the other side is a visible light photocathode, an x-ray image intensifier consisted of two single stage plate image intensifier in series is formed. As a result, the gain of the intensifier is improved greatly, however, spatial resolution of the unit is further limited by the intermediate screen and the two proximity focus structures.

The common weakness of the reverse image type and plate type x-ray intensifiers mentioned above is the use of combination of an x-ray converting screen and photocathode that involves two additional processes m the course of converting the x-ray into photoelectron. The first one is converting x-ray into visible light while the second is transferring visible light to the photocathode. In image transferring, each process will cause certain noise and other factors that make the resolution worse. In addition, there is an inherent contradiction between the resolution and converting efficiency: when increasing the converting efficiency, it is necessary to increase the thickness of the scintillator, however, with the increasing of the scintillator thickness, dispersion of the visible light occurred in passing through the scintillator increases, making the resolution of the x-ray image intensifier worse. The approach of avoiding the above-mentioned situation is to convert the x-ray directly into photoelectron, i.e. to use an x-ray photocathode instead of the above-mentioned converting screen/photocathode combination.

In "Radiology," Vol. 110, PP. 673–676 (1974), an image intensifier was introduced in which an MCP acts both as x-ray photocathode and electron multiplier. U.S. Pat. No. 3,394,261 introduced a similar technology in which one of the image noise generating links was avoided and the spacer of the proximity focus device that causes image element dispersion was decreased. As a result, the spatial resolution of the image intensifier was increased. However, these inventions were not used widely because the quantum efficiency of MCP in 30–100 kv region of medical x-ray is too low and the MCP could not be made in large size at that time.

In 1976, N. G. Alexandropoulos of rice university in the United States introduced a new type x-ray image intensifier in "Nucl. Instrum. and Methods (Netherlands)" Vol. 137, issue 1, P. 49. The said x-ray intensifier is a test prototype of a proximity focus x-ray image intensifier in which an x-ray photocathode (aluminum, CsI, etc.) is used to convert x-ray directly into photoelectrons and a channel electron multiplier matrix is used to multiply the photoelectrons. In 1979, J. E. Bateman and R. J. Apsimon introduced a CsI x-ray photocathode and a prototype of a double-proximity focus x-ray image intensifier formed by a cathode and MCP in "Advances in Electronics and Electron Physics" Vol. 52, PP. 189–200 (1979). The thickness of the said photocathode equals to the thickness of a 5 μm aluminum foil plus the thickness of 200–500 μm porous CsI layer ($\rho=0.18$ gm$^{-1}$cc). The said photocathode can be used to convert x-ray directly into photoelectron and therefore can be used to replace the x-ray converting screen/photocathode combination, as a result, both resolution and sensitivity of the image intensifier are improved. The CsI of such a structure has higher quantum efficiency in dealing with soft x-ray (below 10 kev) than with medical x-ray (energy being 30–100 kev).

In 1987, Tan Kaisheng developed an improved CsI x-ray photocathode as published in "Journal of Electronics of China." The said photocathode is comprised of high/low/high density CsI and has a quantum efficiency as high as 1 to 10 times of that of the high density CsI cathode. In dealing with x-ray below 10 kev, its quantum efficiency is almost the same as the low density one. Moreover the energy of the photoelectrons distributs more concentrically and the spatial resolution is increased. Chinese patent No. 91227072.1 introduced another type of x-ray image intensifier that includes a ceramic envelope, a photocathode comprised of high/low/high density CsI, MCP and a fluorescent screen. By means of this technology, the quantum efficiency of the x-ray photocathode is increased, toughness and spatial resolution of the image intensifier are improved, and the effective area of the image intensifier is enlarged.

U.S. Pat. No. 5,225,670 introduced a similar technology as mentioned above. The x-ray photocathode is of high/low density CsI structure where the density of the low density CsI layer becomes lower and lower from the high density layer to the vacuum. The patent claims that this structure can increase the quantum efficiency of the cathode, however, the rough surface of the porous structure may cause electric discharge and CsI particles come-off.

In the above-mentioned photocathodes which convert x-ray directly into photoelectrons, thick cathode and porous CsI are used for higher quantum efficiency, the photoelectrons generated by the x-ray move random within the CsI layer because of scattering and dispersion, resulting in the deterioration of both spatial and time resolutions.

SUMMARY OF THE INVENTION

One object of the present invention is to provide a new type x-ray image intensifier which may solve the problems of the existing art, raise quantum efficiency of the x-ray photocathode and improve both spatial and time resolutions of the x-ray image intensifier.

To achieve the above mentioned object the present invention uses two new kinds of x-ray photocathodes, one of which has a low/high density alkali halogenide structure and another is based on a field-assisted enhancement mechanism and therefore has higher quantum efficiency and better photoelectron energy distribution and angular distribution than the existing ones, the converting efficiency and spatial resolution are increased, moreover, because the said x-ray photocathode of the present invention has a strong photoelectron extractive field which reduces random movement of the photoelectrons and secondary electrons, the time resolution is improved considerably.

The x-ray photocathode in accordance with the present invention is comprised of a proper metal substrate which functions as a conducting medium and a supporting component and therefore is made of light metal such as aluminum or titanium sheet or other dielectric material with low x-ray absorption coating of light metal, a specially constructed alkali halogenide (e.g. CsI or CsBr, etc.) emitting layer which is evaporated on the surface of the substrate and forms a porous low density alkali halogenide coating, and an outer coating which is a layer of high density alkali halogenide (e.g. CsI or CsBr, etc.) evaporated on the foregoing coating. The layer of the high density alkali halogenide has a smooth microscopic surface on the vacuum side which is required by an image intensifier with high spatial resolution. The said low/high density structure has higher converting efficiency than a pure low density layer or a high/low/high or high/low density structure.

The field-assisted x-ray photocathode is formed by forming an extremely thin layer of metal onto the emitting surface to function as an extractive electrode. The layer is so thin that it will allow the photoelectrons and secondary electrons to pass through it and escape into the vacuum. As a result, the quantum efficiency, spatial resolution and time resolution are improved.

The proximity focused x-ray image intensifier in accordance with the present invention includes an x-ray photocathode(either low/high density type or field-assisted type), an MCP (Micro Channel Plate), a phosphor screen, a metal/ceramics envelope which is evacuated to a pressure less than $10^{-7}$ torr. The x-ray photocathode converts the x-ray image directly and efficiently into electronic image which is then amplified by MCP and finally converted into a visible light image by the phosphor screen.

Generally, the proximity focus image intensifier has 5 electrodes i.e. photocathode, photocathode bias electrode, MCP input, MCP output and the phosphor screen. When low/high density cathode configuration instead of field assisted cathode is used, there are only 4 electrodes as mentioned above but without a photocathode bias electrode.

The x-ray image intensifier of the present invention can be an inverse image type with an electron-optical focus system.

The proximity focus image intensifier according to the present invention can be made as large as allowed by MCP, say 100 mm in diameter, while the size of the x-ray photocathode can be as large as allowed by the tube.

The x-ray photocathode of the present invention can be used in other x-ray sensors, such as x-ray detectors with different time resolution, x-ray sensitive photoelectric robe and photomultiplier, x-ray position-sensitive detector, x-ray streak camera and framing camera, etc.

The proximity focused x-ray image intensifier in accordance with present invention may be used to construct other instruments, such as x-ray diagnosis unit, single or multiple frame X-ray high speed camera where the x-ray image intensifier is in strobe mode with exposure time depending on the width of the switch pulse which can be as short as some nanoseconds, and portable x-ray diagnosis unit, etc.

The portable x-ray diagnosis unit according to the present invention can be comprised of a proximity x-ray image intensifier, a compact x-ray source, a power supply unit and a housing which accommodates the above mentioned components.

The power supply unit consists of a filament power supply and a high voltage DC power supply which provide power to the x-ray tube, a compact power supply which supplies power to the x-ray image intensifier and an adopter for 220 v/110 vac to 12 vdc. A cone protective cover is added to the outlet of the x-ray source.

DESCRIPTION OF THE PREFERRED EMBODIMENT

Embodiments of this invention will be explained with reference to the drawings attached hereto.

Figure 1:
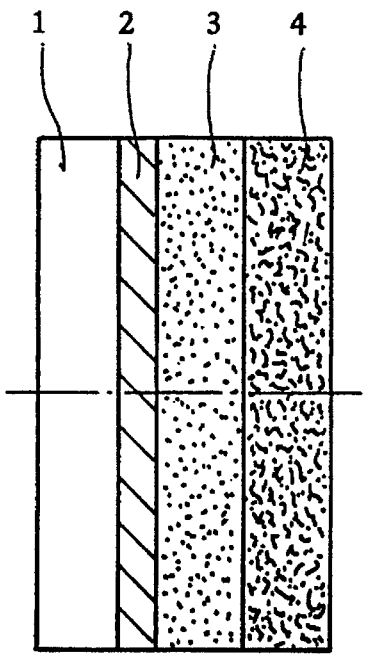
FIG. 1 shows a schematic diagram of an embodiment of the present invention where the x-ray photocathode which can convert x-ray directly to photoelectron consists of a low/high density alkali halogenide.

An Embodiment of the present invention is shown in FIG. 1 schematically where the x-ray photocathode which can convert an x-ray image directly into a photoelectron image is comprised of substrate 1, a conductive layer 2, an emitting layer 3 and an emitting layer 4. The substrate 1 can be any kind of material which is transparent to x-ray or absorbs very little the x-ray to be detected and is good for usage in high vacuum. When the substrate 1 is dielectric material such as glass, the conductive layer 2 can be an evaporated pure aluminum film of 5 μm thick. When the substrate 1 is made of 0.1 mm thick aluminum foil, the conductive layer 2 can be omitted. The emitting layer 3 is a low density alkali halogenide layer which is formed by evaporating CsI on the conductive layer in a low pressure argon or nitrogen atmosphere until reaching a thickness of about 200–500 μm. The emitting layer 4 is a high density alkali halogenide layer which is evaporated on the said low density layer 3 at vacuum of $10^{-6}$ torr until reaching a thickness of 200–500 μm.

Figure 2:
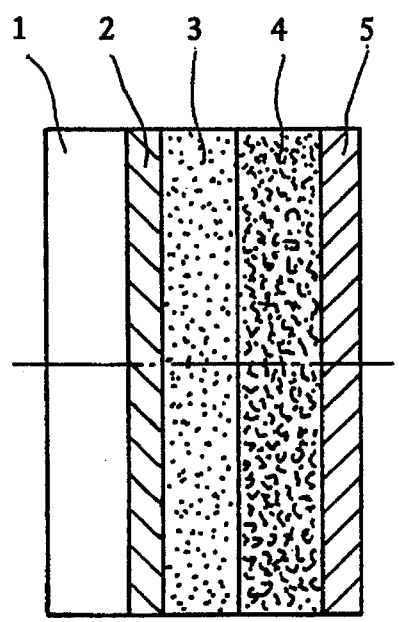
FIG. 2 shows a structural diagram of an x-ray photocathode built up on the basis of field-assisted theory according to the present invention.

FIG. 2 shows another embodiment of the present invention where an aluminum film is evaporated on the said high density CsI layer at vacuum of $10^{-6}$ torr until reaching a thickness of 200 Å and functions as a field-assisted electrode. Therefore, a field-assisted x-ray photocathode is formed.

Figure 3A:
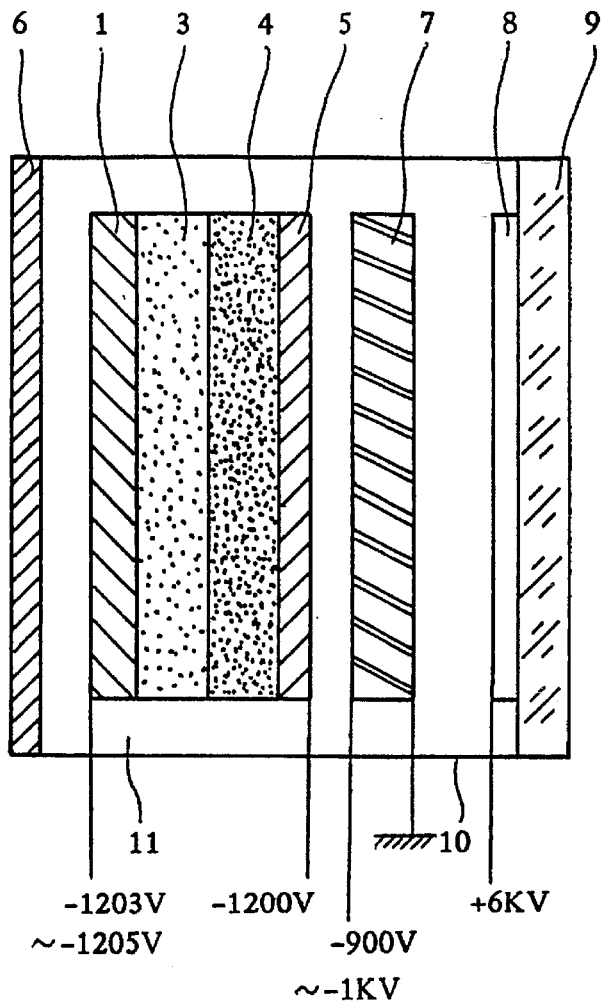
FIGS. 3A and 3B show structural diagram of a proximity focus x-ray image intensifier with a field-assisted x-ray photocathode.
Figure 3B:
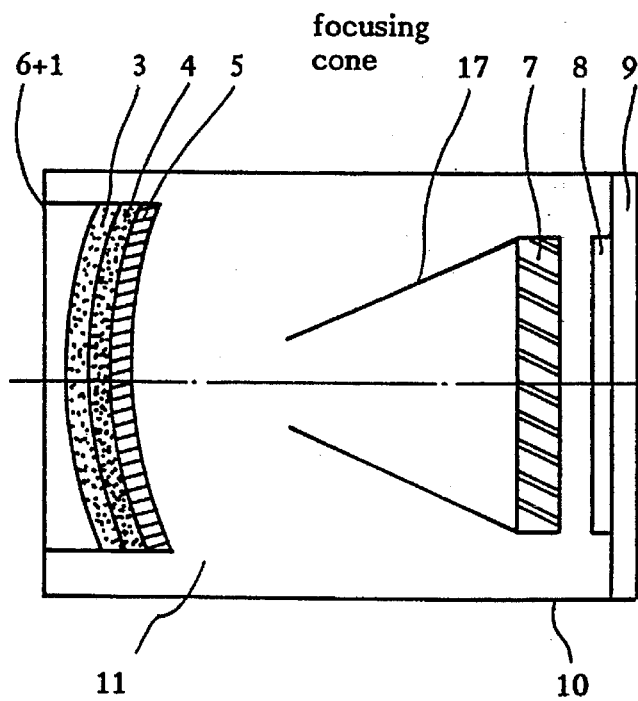

As shown in FIG. 3, a 100 mm diameter proximity focus x-ray image intensifier 11 was built which has an input window 6 made of 0.5 mm titanium foil, an x-ray photocathode 1, 3, 4 and 5 which is basically the same as shown in FIG. 2 but without layer 2 because the substrate 1 here is an aluminum plate of 0.5 mm thick, an MCP 7, a phosphor screen 8, an output window 9 and an envelope 10. The outout surface of the MCP is grounded. The voltage of the input surface of the MCP is about –900 v–1000 v. The voltage of field-assisted electrode 5 is about –1200 v. The substrate of aluminum is connected with –1203 v–1205 v. The phosphor screen is connected with +6000 v.

Figure 4:
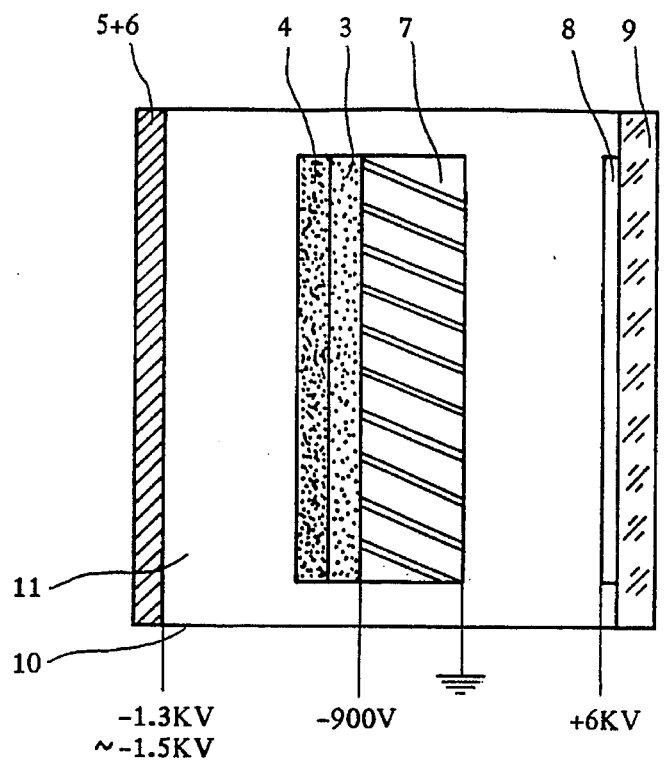
FIG. 4 shows the structure of another embodiment of the present invention where the x-ray image intensifier has an x-ray photocathode which is formed by depositing low/high density alkali halogenide directly onto the input surface of MCP.

FIG. 4 shows another x-ray image intensifier as an embodiment where the emitting layer is formed directly on the input surface of the MCP and the input window functions as the extractive electrode (i.e. field-assisted electrode) and a part of envelope.

In order to keep vacuum ($10^{-7}$ torr) of intensifier and obtain good mechanical property, the tube is metal/ceramics seal, leaving a gap of 0.3–0.5 mm between photocathode and input surface of MCP and a gap of 0.8–1.5 mm between output surface of MCP and the phosphor screen.

The 100 mm diameter double proximity focused x-ray image intensifier produced by above mentioned process has an output brightness of more than 25 $cd/m^2$, a spatial resolution of 10 line pair/mm or above, a conversion coefficient of 18 candle. $s/ml.m^2$ and an order of $10^{-12}$ sec of time resolution. The performance of such an x-ray image intensifier relies mainly on the fact that the photoelectron and secondary electron generated by the incident x-ray (30 kev–90 kev) in layers 3 and 4 drift to the emitting surface and finally escape into the vacuum under the action of the added extractive field which is so strong that the random movement of the photoelectron and secondary electron in the cathode are minimized, their dispersion is suppressed, the angular distribution of emitted electron is optimized and the standing time of the electron in the cathode is shorted. As a result, the spatial and time resolution are improved.

Figure 5:
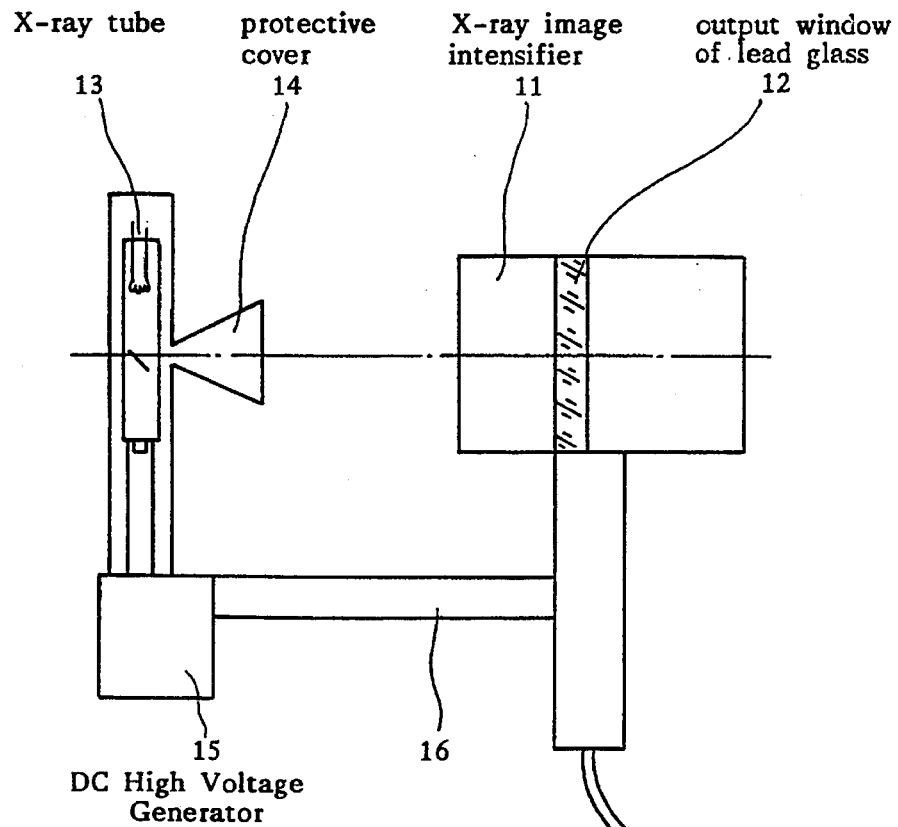
FIG. 5 shows a portable x-ray diagnosis unit which incorporates the proximity focused image intensifier and a compact x-ray source of the present invention.

FIG. 5 shows a portable x-ray diagnosis unit which comprises the proximity focused x-ray intensifier of the present inventin 11, a compact x-ray source which consists of a small x-ray tube 13 and a cone protective cover 14, a DC high voltage generator, an output window of lead glass and a frame 16. The feature of the portable x-ray diagnosis is incorporation of the x-ray image intensifier which provides a higher conversion efficiency and the compact x-ray source with a cone protective cover which protects x-ray leakage.

What is claimed is:

1. A proximity focused X-ray image intensifier, comprising:

an input window, an X-ray photocathode, a microchannel plate, an output window with a phosphor screen on its interior side, an envelope, and a vacuum cell, wherein the X-ray photocathode is a field-assisted X-ray photocathode.

2. A proximity focused X-ray image intensifier according to claim 1, wherein the photocathode is comprised of a photocathode conducting base which is a light metal sheet material selected from the group which includes aluminum, titanium or a dielectric material including glass covered by a layer of light metal, and wherein said conducting base is coated with an X-ray sensitive photoelectric emitting layer comprised of a layer of low density alkali halogenide and a layer of high density alkali halogenide, wherein the alkali halogenide is selected from the group including CsI, CsBr, and CuI, and wherein said field assisted photocathode is a metal coating evaporated onto the photoelectric emitting layer.

3. A proximity focused X-ray image intensifier according to either of claims 1 or 2, further comprising an X-ray source having an outlet, and wherein said X-ray source has a cone protective cover on said outlet of said X-ray source.

4. A proximity focused X-ray image intensifier according to claim 1, wherein the photoelectron cathode is comprised of a photoelectric cathode conducting base which is a light metal sheet material selected from the group which includes aluminum, titanium, or a dielectric material including glass covered by a layer of light metal, and wherein said conducting base is coated with an X-ray sensitive photoelectric emitting layer comprised of a layer of low density alkaline metal halogenide and a layer of high density alkaline metal halogenide, wherein the alkaline metal halogenide is selected from the group including SsI, CsBr, and CuI, and a field assisted electrode is a metal coating vapor plated onto the photoelectric emitting layer.

5. A proximity focused X-ray image intensifier, comprising:

an input window,

X-ray photoelectric cathode, an MCP layer, an output window, a tube, and a vacuum cell, wherein the photoelectric cathode is a low/high density structured alkaline metal halogenide X-ray cathode.

6. A proximity focused X-ray image intensifier according to claim 1, wherein the X-ray photocathode is deposited directly on the input surface of the microchannel plate.

* * * * *